United States Patent [19]
McCreery et al.

[11] 3,973,307
[45] Aug. 10, 1976

[54] CUTTING INSERT
[75] Inventors: James F. McCreery, Latrobe; Dennis G. Jones, Greensburg, both of Pa.
[73] Assignee: Kennametal Inc., Latrobe, Pa.
[22] Filed: Apr. 7, 1975
[21] Appl. No.: 565,808

Related U.S. Application Data
[63] Continuation-in-part of Ser. No. 528,211, Nov. 29, 1974, which is a continuation-in-part of Ser. No. 339,415, March 8, 1973, abandoned.

[52] U.S. Cl. .............................................. 29/95 R
[51] Int. Cl.² .......................................... B26D 1/00
[58] Field of Search ............. 29/95, 96, 97, 98, 102, 29/105

[56] References Cited
UNITED STATES PATENTS

| | | | |
|---|---|---|---|
| 1,756,516 | 4/1930 | Klopstock | 29/95 |
| 2,055,769 | 9/1936 | Kinzel | 29/95 |
| 2,289,344 | 7/1942 | Cedarleaf | 29/102 |
| 3,078,546 | 2/1963 | Kiernan | 29/95 |
| 3,137,059 | 6/1964 | Hertel | 29/96 |
| 3,137,917 | 6/1964 | Dowd | 29/95 |
| 3,152,385 | 10/1964 | Wheildon, Jr. et al. | 29/95 |
| 3,381,349 | 5/1968 | Newcomer | 29/96 |
| 3,395,434 | 8/1968 | Wirfelt | 29/95 |
| 3,548,473 | 12/1970 | Stein | 29/95 |

Primary Examiner—Harrison L. Hinson
Attorney, Agent, or Firm—Melvin A. Crosby; Lawrence R. Burns

[57] ABSTRACT

A cutting insert of hard wear resistant material which provides a cutting edge useful over very wide ranges of metalworking conditions and effective for reducing cutting machine power requirements and providing safe and efficient chip control, simultaneously. The cutting insert has a narrow land area along the cutting edge and a wall means leading downwardly and inwardly from the inner edge of the land area and a planar surface extending inwardly from the lower edge of the wall means. The insert is free of any "chip groove," having a rising rearward wall, per se, and dimensions are given wherein it has been found that chip formation and breakage occur as naturally as possible with a minimum of work effort input for bending or breaking the chip. Power consumption is reduced and individual chip formations are controllable over a wider range of work conditions than heretofore possible.

4 Claims, 11 Drawing Figures

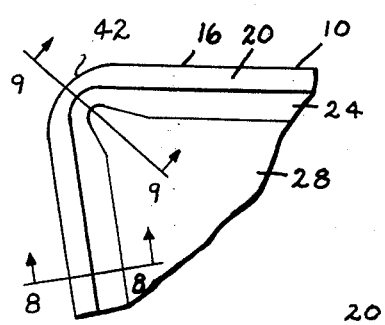
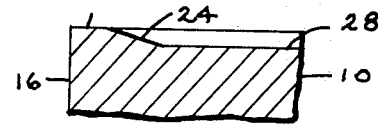
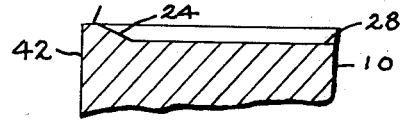
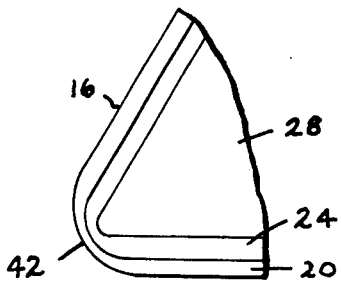
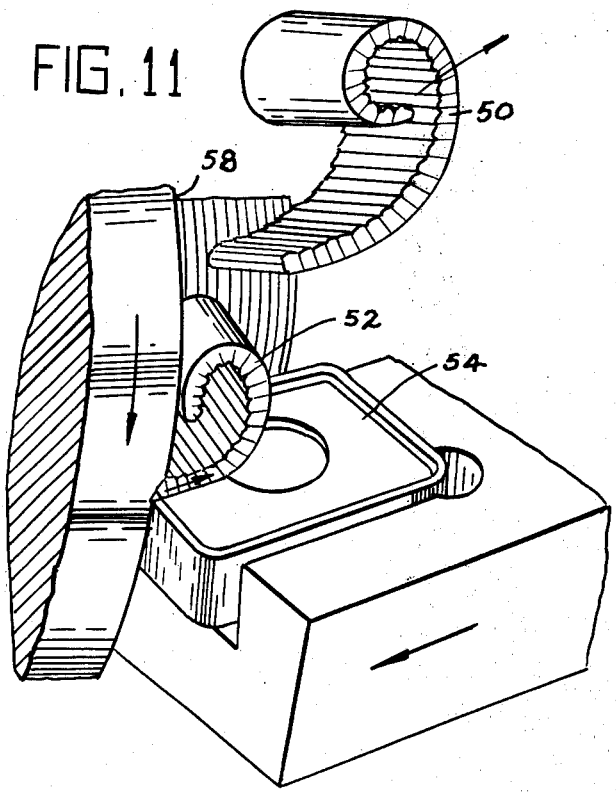

CUTTING INSERT

RELATED APPLICATION

The present application is a Continuation-in-Part of U.S. Pat. Ser. No. 528,211, filed Nov. 29, 1974, entitled "CUTTING INSERT," which was a Continuation-in-Part of U.S. Pat. Ser. No. 339,415, filed Mar. 8, 1973, now ABANDONED.

BACKGROUND OF THE INVENTION

The insert of the present invention relates to the metalworking industry and the geometric design of hard wear resistant "throw away" types of the cutting inserts.

Hard wear resistant materials, such as cemented hard metal carbides, have revolutionized the metal-working industry since their introduction back in about 1927. For a look at the tremendous impact that hard wear resistant cutting inserts, especially cemented hard metal carbides, have had upon the industry, reference should be made to FIG. 6 on Page 9 of Cemented Carbides by Dr. Paul Schwarzhopf and Dr. Richard Keiffer, published by The Macmillan Company in 1960.

FIG. 6 referenced therein shows that between 1900 and 1927 the cutting speed for sixty minutes of tool life increased only from 80 ft./minute to 120 ft./minute. With the introduction of the cemented carbides over the then used high speed tool steel, the cutting speed for sixty minutes of tool life then increased dramatically from the 120 ft./minute to up around 800 to 1,000 ft./minute by the 1960 publication date of the book.

Today, further improvements in the materials forming the cutting tools have added significantly to the cutting tool life such that the sixty minute tool life referred to in the reference has been increased at least an order of magnitude greater than shown in the referenced graph.

The advent of the tremendously increased speeds did not, however, come without its problems. Before the increased speeds became possible, the only concern was the removal of metal material from the workpiece. The question of how the cut metal came away from the workpiece was of no main concern to anyone as the thin continuous metal flowing from the cutting tool at those low speeds could easily be guided by the machine operator into a waste bin or other suitable container.

For this reason, with most of the machining prior to 1927, the metal removed from the workpiece came off as a continuous strip of material and simple guidance and observance by a careful operator was all that was required to maintain safe removal and disposition of the removed metal.

However, from about 1927 and on, with the significantly increased cutting speeds, and the also increasing strength of the cutting inserts, the increasing feeds and speeds were producing a very dangerous working condition for the machine operator.

First, the increased speed of continuous metal removal meant that the metal was coming off the workpiece at a faster rate than the machine operator might react to and, further, a thicker, stronger chip was being produced by the increased feed rates so that, even if the operator could possibly react to the snaking chip, he might not be strong enough to bend the snaking chip to his will. The fact that the snaking chip was also red hot, in addition to the above problems, now made the situation very dangerous and solutions to the safety problems had to be achieved.

The solution to the chip problem from the time the problem came into being until the present invention has resided in one form or another of mechanically bending the snaking chip as it comes from the workpiece so as to break it into small individual chips that fall harmlessly to the floor before endangering the operator and, also, do not interfere with the cutting edge of the cutting tool and the workpiece surface.

"Chip breakers" then came into existence and were recognized as necessary to the metalworking industry. Chip breakers took many forms but, essentially, operated on the principal that the chip should first flow away from the cutting edge of the cutting tool before it could be acted upon. Once away from the workpiece, it was then recognized as necessary to place a mechanical obstruction in its free flow path to mechanically force the chip to bend away from its free flow path and thereby break into small chips and fall harmlessly into a suitable container.

Cutting inserts, heretofore, have been made and used in conjunction with chip breaker or chip control regions in the form of rises formed thereon spaced inwardly from the cutting edge. Other inserts utilized a separate chip breaker in the form of a super-structure which was clamped against the insert. Using either form of chip controller involves extra expense and inconvenience, either in the molding of the insert or the insert set-up configuration.

In addition to the extra expense and inconvenience of the chip breakers, there is, further, the fact that the forced metal deflection as the chip flows into the rising chip breaker element requires greater machine horsepower consumption than if the chip were to flow freely across the surface of the cutting tool.

As the prior art of chip breakers has progressed, there has been produced a large number of chip breaker configurations and cutting insert geometries that provide higher speeds and feeds for certain materials but are within limited ranges for each application or use. The chips that are produced in one given set of working parameters (such as feed, speed and type of metal workpiece) usually are not so satisfactory when the parameters change out of their narrow and limited range of usefulness.

In the present age of numerical controlled machines, the need for efficient metal removal with effective chip control is absolutely essential. What is also essential is a cutting insert capable of achieving the efficiency and chip control over wider ranges of parameters of speeds, feeds and type of metal workpiece. Tool planners for the numerical controlled machines would then be able to buy more standard cutting inserts, thus, reducing overall tooling costs and less set-up time would be required for changeover of cutting set-ups from one machining job to another.

It has been found by tests and experimentation that an insert according to the present invention can be formed so as to eliminate the need for a rising chip breaker, or chip control, surface on the insert, or for an extra chip control member, at least for a large class of work.

With the foregoing in mind, a primary object of the present invention is the provision of a cutting insert having improved cutting characteristics and which is relatively simple to mold.

Another object of the present invention is the provision of a cutting insert in which the land area is exposed for any finishing operations it might be desired to carry out thereon.

Another object is the provision of an insert in which complex chip control configurations are eliminated thereby making it simpler to mold the insert and requiring less material in the insert.

Another object of the present invention is the provision of a broader range of chip control than is obtainable with previous insert designs.

Another object of the present invention is the provision of a cutting insert which reduces the machine power consumption required for cutting and is less expensive and gives a much broader range of chip control than previously known.

BRIEF SUMMARY OF THE INVENTION

According to the present invention, a hard wear resistant insert, preferably, a molded insert which is made, for example, from a cemented hard metal carbide, ceramic, or the like, is provided with a configuration for more efficiently removing metal and providing chip control over a wider range of parameters than has heretofore been possible.

The insert has parallel top and bottom faces and a peripheral wall extending therebetween. At the juncture of the peripheral wall, with at least one of the top and bottom faces of the insert, there is formed a cutting edge, and extending inwardly of the respective face of the insert from the cutting edge is a relatively narrow land area which is from 0.005 to 0.060 inches in width.

At the inner edge of the land area is a descending wall means. The descending wall means may incline downwardly in the direction toward the center of the insert, or it may take the form of a large fillet, or an abrupt descent or an abrupt descent with a small fillet at the bottom. The descent from the cutting edge land area to the bottom is from 0.002 to 0.010 inches in depth.

From the lower edge of this descending wall means, there is a substantially horizontal wall which may extend completely across the insert parallel to the plane of the respective face, or which may terminate in a more or less abrupt rise near the center of the insert in a region spaced so far from the cutting edge that the rise does not perform any chip controlling function.

The insert according to the present invention, thus, has no rising chip breaker or chip control surface formed thereon to unnecessarily impede the natural flow of the chip; however, the chips taken are efficiently deflected by contacting the aforementioned descending wall means and the substantially horizontal wall. No extra chip control member needs to be provided for the satisfactory operation of metal removal and chip control over extremely wide ranges of metal removing conditions.

The exact nature of the present invention will become more apparent upon reference to the following detailed specification taken in connection with the accompanying drawings in which:

FIG. 7 shows a corner configuration for certain inserts of the present invention having a rhomboidal shape.

FIG. 8 is a cross sectional view indicated by line VIII—VIII of FIG. 7.

FIG. 9 is a cross sectional view indicated by line IX—IX of FIG. 7.

FIG. 10 shows a corner configuration for certain inserts of the present invention having a triangular shape.

FIG. 11 is a perspective view of the working relationship of the present invention forming chips from a workpiece.

DETAILED DESCRIPTION OF THE INVENTION

Figure 1:
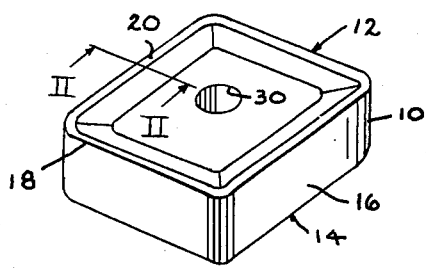
FIG. 1 is a perspective view of a typical insert of the present invention.

Referring to the drawings more in detail, the insert shown in FIG. 1 is typical of the polygonal inserts which can be produced with the unique cutting edges of the present invention. The insert in FIG. 1 is a square rectangular insert comprising a body generally indicated at 10 and which consists of a top face, or side, 12 and a bottom face, or side, 14 disposed in spaced parallel planes and a peripheral wall 16 extending between the planes of the top and bottom faces.

Figure 2:
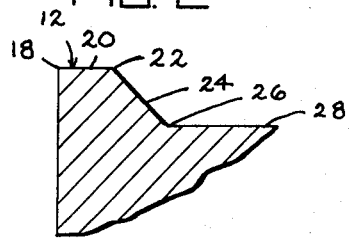
FIG. 2 shows a sectional view indicated by line II—II in FIG. 1.

In FIGS. 1 and 2, wall 16 is perpendicular to the planes of faces 12 and 14. At the juncture of the peripheral wall 16 with the plane of top face 12, there is formed a cutting edge 18 which extends completely around the insert.

Immediately adjacent cutting edge 18 and extending toward the center of body 10 of the insert is a land area 20 which is on the order of from 0.005 to 0.060 inches in width. The land area 20 in FIGS. 1 and 2 is perpendicular to peripheral wall 16. The land area may be of substantially uniform width along the entire length of the cutting edge, or it may be more narrow at the corners of the insert for more positive control of chips at light feed rates and depth of cut.

From the inner edge 22 of the land area 20 in FIG. 2, there extends downwardly a descending wall means 24 inclined downwardly toward the center of the body 10. This wall is of uniform inclination and extends along the entire length of the land area 20 of the insert. Extending from the lower inner edge 26 of the inclined wall is a horizontal wall 28 substantially parallel to the plane of a face 12 of the insert. Wall 28 may extend completely across the upper face of the insert with no rises therein. The insert may or may not comprise a center hole 30 as shown in FIG. 1 to assist in securing the insert to a holder. As will be seen in the drawings, the plane of wall 28 and the plane of land area 20 are substantially parallel and are spaced apart from about 0.002 to 0.010 inches. Under usual metalworking parameters and conditions, the curl of the chip becomes tighter as the depth of the recess becomes shallower.

The wall 24, when inclined, may be inclined at various angles, for example, from about 13° to the horizontal down to about 30°.

The inserts can be formed with cutting edges on both top and bottom faces but, when this is done, the horizontal wall 28 can abruptly rise near the center to form an island area that will support the insert in such a manner that the cutting edge which is facing downwardly in the tool holder is protected from damage. Inserts with cutting edges on both sides, instead of having an island area formed thereon, may also be supported by a shim which is formed so as not to engage the land area on the underside of the insert.

FIG. 2 shows a preferred relationship of a cutting edge 18, the land area 20, the descending wall means 24 and the horizontal wall 28. In any particular metalworking situation, the strength required at the peripheral cutting edge and land area of the insert must be considered. For very heavy depths of cut or feed rates, the peripheral cutting edge and land area must be supported in the best possible manner.

FIG. 2 depicts one of the easiest to fabricate and strongest configurations that has utility over the widest range of metalworking situations. Here, the width of land area 20 can vary from 0.005 to 0.060 inches depending on how much strength might be required on the land area. For lighter cuts, the width of the land area performs very well in ranges of width closer to the 0.005 inches whereas, for much heavier cuts, the width of the land area should start increasing in width toward the 0.060 inches figure. For chip control, the angle that descending wall means 24 makes with the horizontal may be varied and, also, the vertical distance between the subtantially parallel planes of land area 20 and horizontal wall 28 may be varied.

In the industry of metalworking, as has been pointed out before, chip control is very important. When the chip is separating from the workpiece, it is very desirous to have it curl first and then break off from its parent chip so that discrete, individual, curled chips provide a safer environment for the machine operator and, furthermore, enhance safer handling of the waste chips when being further processed or handled in the machine shop or elsewhere.

When referring to the curled chips, the terms tight and loose are used. Tight refers to the condition wher the chip is tending to curl too much and chips may break off in a smaller size than would be desired. On the other hand, loose chips are chips that are not curling as much as the ideal chip and may be breaking off in larger size chips than would be desired. Within certain ranges of tight chips and loose chips, the chips may be acceptable in metalworking production, unless a chip is referred to as too tight and too loose in which case the chips are then unacceptable.

Referring to FIG. 2, now, and considering chip control, there are two parameters which can effect chip control either being tight or loose. These, as mentioned above, are the angle of the descending wall means 24 and the vertical distance between the substantially parallel planes of land area 20 and horizontal wall 28. As the angle of the descending wall means from the horizontal becomes greater, the curl of the chip becomes tighter. As the vertical distance between the substantially parallel planes becomes shallower, the curl of the chip also becomes tighter.

In preferable embodiments of the present invention, the angle will vary from 13 to 45 from the horizontal and the vertical distance will vary from 0.001 to 0.010 inches. As will be shown in following figures, the limitation of 45° for a preferable embodiment is only for strength consideration when engaged in heavier cuts, when not particularly concerned with the strength requirements the angle may be greater than 45° from the horizontal.

It should also be mentioned that, in addition to the configuration parameters embodied on an insert of the present configuration, variation of the feed rate of the cut also controls the curl of the chip. When using an insert of the present invention, as the feed rate of the cut increases, so does the tightness of the curl of the chip being taken.

Figure 3:
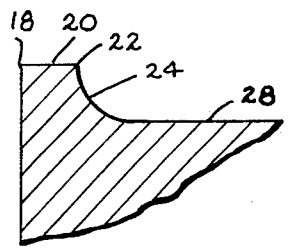
FIG. 3 is a view like FIG. 2 but shows a modification.

In FIG. 3, a view like FIG. 2 is shown but with a permissible modification of the descending wall means 24. Efficient cutting and chip control are still achievable if the descending wall means 24 is a fillet radius extending from the inner edge 22 of land area 20 downward and adjoining horizontal wall 28. The preferred embodiment of the invention, of course, still would have the land 20 width being from 0.005 to 0.060 inches and the vertical distance between the substantially parallel planes from 0.001 to 0.010 inches with the radius being determined by selection of the above two mentioned parameters.

Figure 4:
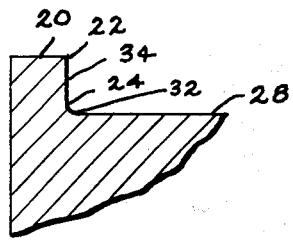
FIG. 4 is a view like FIG. 2 but shows a modification.

FIG. 4 is a view like FIG. 2 but shows still another permissible modification of the descending wall means 24. In this view, descending wall means 24 is comprised of a vertical section 34 and a fillet radius 32. Beginning at the inner edge 22 of land area 20, a vertical wall 34 descends toward horizontal wall 28 and joins the upper side of fillet radius 32. Fillet radius 32 then extends further downward until it joins horizontal wall 28.

The preferred embodiment of an insert according to FIG. 4 would, again, have the width of land area 20 varying in range from 0.005 to 0.060 inches and the vertical distance between the substantially parallel planes varying from 0.001 to 0.010 inches. The fillet radius 32 would then be made preferably from one to four times the vertical distance between the substantially parallel planes. The variation of the fillet radius in a FIG. 4 embodiment would, of course, have more to do with strength considerations of support of the land area 20 than with efficient chip control.

Figure 5:
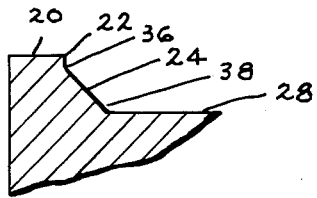
FIG. 5 is a view like FIG. 2 but shows a modification.

In FIG. 5 is shown a view like FIG. 2 with still another permissible modification of the descending wall means. In this embodiment, descending wall means 24 is comprised of a vertical portion 36 and a downwardly inclining portion 38. Vertical portion 36 drops substantially vertically downward from the inner edge 22 of land area 20 until it joins a downwardly inclining portion 38. Downwardly inclining portion 38 then extends from the lower point of portion 36 downward to the horizontal wall 28 of the molded insert. The preferred embodiment of this configuration may be as desired for strength purposes as long as the land area 20 width is from 0.005 to 0.060 inches and the vertical drop between the substantially parallel planes is from 0.001 to 0.010 inches.

Figure 6:
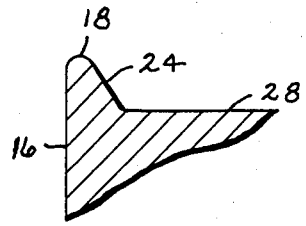
FIG. 6 shows a modified form of the cutting edge of the present invention.

In FIG. 6 is shown a view like FIG. 2 but with a permissible modification of the cutting edge 18. Shown therein is peripheral wall 16 rising above the horizontal wall 28 and forming a radius portion or cutting edge 18 that adjoins descending wall means 24. The preferred embodiment of this particular configuration would be that the vertical distance from the top of the radiused cutting edge 18 to the horizontal wall portion 28 could vary from 0.001 to 0.010 inches in depth with the radius 18 being about 0.002 inches. The acute angle formed between the planes of peripheral wall 16 and descending wall means 24 would be in the range of 15° to 45°.

While the inserts of the present invention have shown useful versatility over a substantially wide range of metalworking conditions, it has also been found that the substantial range may be broadened even further by the further modifications as shown in FIGS. 7, 8 and 9. FIG. 7 shows a top view of an insert according to the present invention and having a rhomboidal shape. Depicted in FIG. 7 is a corner configuration which further broadens the wide range of usefulness of inserts according to the present invention, especially when taking very light cuts.

A molded insert 10 according to the present invention having a horizontal wall 28, a descending wall means 24, a land area 20 and peripheral wall 16 is provided with a radius nose portion 42 joining peripheral walls 16 at the corners of the insert. It has been found that for very light cuts, the inclination of descending wall 24 from the horizontal should be greater in the corner areas. Very good chip control on light cuts is effected in this manner. By way of example, what is shown in FIG. 8 is the configuration of the descending wall means as was earlier described in FIG. 2. The descending wall means has an angle of 15° with the plane of land area 20 along its lateral side wall portion 16. However, the descending wall portion 24 near the radiused nose portion 42 of insert 10 should increase its inclination from 15° with the horizontal to around 25° with the horizontal.

These figures of 15° and 25° are only by way of example, it being understood that it is the increasing angle of inclination as the descending wall portion 24 passes from the lateral side portion 16 into the radiused nose portion 42 of the molded insert 10 that is important. Also, as the angle of inclination increases, the width of land area 20 decreases until it reaches the bisector of the radiused nose portion 42 and than it gradually increases back to its full width again as it passes out of the radiused nose portion and back to the lateral side wall portion 16. In a preferred embodiment, the width of the land area 20 at the bisector of the nose radius 42 would be from 0.003 to 0.007 inches.

FIG. 10 depicts how the corner configuration described in FIGS. 7, 8 and 9 would look in a top view of a triangular insert instead of a rhomboidal insert.

FIG. 11 is a fragmentary view taken from a photograph showing an actual turning condition. In the photograph, the material being turned is heat treated 4340 steel having a hardness of 32 Rc. The rate at which the material is being cut is 0.500 inches deep with a feed rate of 0.050 inches and with the work moving at 250 surface feet per minute.

In the figure, it will be seen that a chip 50 is broken off while the following chip 52 is still forming. The portion of chip 52 adjacent the work is sliding substantially horizontally over the top of insert 54 as indicated by arrow 56 while the chip is curled off and engaging the shoulder 58 of the workpiece being turned. Chip 52 will continue to form until it is about the size of chip 50 and at which time the chip material feeding off from the work commences to curl upwardly from the face of the insert and snaps the chip off.

The oncoming chip material will then curl upwardly and backwardly as shown for chip 52 in FIG. 11 and again come into engagement with shoulder 58 and ride thereon until new chip material slides out over the insert and the chip again slides off.

It will be noted that the movement of the chip material in curling up away from the insert takes place without the use of any rising chip controlling shoulders on the insert and the chip forming operation is, thus, carried out with a minimum loss of power.

Modifications may be made within the scope of the appended claims.

What is claimed is:

1. A cutting tool for use in removing metal chips from a workpiece and comprising: a body of hard wear resistant material having top and bottom surfaces and a peripheral wall extending between said top and bottom surfaces; a radiused cutting edge formed on one of said surfaces along the juncture of said one surface with said peripheral wall; descending wall means extending downwardly from said radiused cutting edge and a planar floor means extending inwardly towards the center of said tool from the lowest edge of said descending wall, the distance from the top of said radiused cutting edge to said planar floor being less than the distance from said peripheral wall to the juncture of said descending wall means with said planar floor.

2. A cutting tool according to claim 1 in which said cutting tool comprises a polygonal molded insert.

3. A cutting tool according to claim 2 in which the distance from the top of the radiused cutting edge to the planar further wall ranges from 0.001 to 0.010 inches.

4. A cutting tool according to claim 2 in which said radiused cutting edge is formed from the arc of approximately a 0.002 radius.

* * * * *